United States Patent
Salsman et al.

(10) Patent No.: US 7,157,139 B2
(45) Date of Patent: Jan. 2, 2007

(54) POLYMER MANUFACTURING PROCESS

(75) Inventors: Keith Salsman, Hoschton, GA (US); Grant Doney, Surrey (CA)

(73) Assignee: Grant W. Doney, Acworth, GA (US)

(*) Notice: Subject to any disclaimer, the term of this patent is extended or adjusted under 35 U.S.C. 154(b) by 0 days.

(21) Appl. No.: 10/827,028

(22) Filed: Apr. 19, 2004

(65) Prior Publication Data

US 2005/0234213 A1    Oct. 20, 2005

Related U.S. Application Data

(60) Provisional application No. 60/487,115, filed on Jul. 15, 2003.

(51) Int. Cl.
*B32B 5/14* (2006.01)
*B32B 7/02* (2006.01)
*C08F 20/00* (2006.01)

(52) U.S. Cl. .................. 428/308.4; 528/272; 528/308; 528/308.6; 525/437; 525/440; 525/444; 428/221; 428/304.4; 428/308.4

(58) Field of Classification Search ............... 528/272, 528/308, 308.6; 525/437, 440, 444; 428/221, 428/304.4, 308.4
See application file for complete search history.

(56) References Cited

U.S. PATENT DOCUMENTS

| | | | | | |
|---|---|---|---|---|---|
| 5,319,128 | A | * | 6/1994 | Dupont et al. | 560/78 |
| 5,554,657 | A | * | 9/1996 | Brownscombe et al. | 521/48 |
| 5,820,982 | A | * | 10/1998 | Salsman | 428/364 |
| 6,534,624 | B1 | * | 3/2003 | Ito et al. | 528/271 |
| 6,670,429 | B1 | * | 12/2003 | Appelman et al. | 525/444.5 |

* cited by examiner

*Primary Examiner*—Samuel A. Acquah
(74) *Attorney, Agent, or Firm*—Hunton & Williams LLP

(57) ABSTRACT

A process utilizing PET as a reactive constituent to manufacture other polymers containing the pre-condensed moieties by the rapid transesterification of the condensation polymer with a pre-made modifying polymer containing the desired mix of other monomers. The process involves as a first step the manufacture of a modifying polymer containing the desired mix of acids and alcohols to a specific molecular weight such molecular weight dependent on the desired final level of utilized condensation polymer and the finished molecular weight. The second step of the process involves the rapid buildup of molecular weight and/or polymer uniformity by the rapid transesterification of the condensation polymer with the modifying polymer. The second step can be performed in any suitable vessel including an extrusion line. The process has the advantage of greatly reduced cycle times over other condensation polymer utilization processes such as the recycling of PET into other materials.

20 Claims, No Drawings

POLYMER MANUFACTURING PROCESS

This application claims priority under 35 U.S.C. §119 to Provisional Patent Application No. 60/487,115 filed on Jul. 15, 2003, disclosure of which is incorporated herein by reference in it's entirety.

BACKGROUND OF THE INVENTION

1. Field of the Invention

Applicant's invention relates to a polymer manufacturing process that utilizes polyethylene terephthalate.

2. Background Information

Esterification is the condensation of organic carboxylic acids and alcohols to yield ester linkages. Polyesters are made when multifunctional carboxylic acids are reacted with multifunctional alcohols to yield polymers containing repeating ester units. Polyesters have become important polymer components used in a variety of industries.

The esterification reaction required to manufacture polyester polymers takes a great deal of time compared to other polymerization reactions. For example a typical aromatic polyester of moderate molecular weight can require between 12 and 24 hours to finish whereas an aromatic styrene polymer prepared by free radical polymerization can take as little as one hour to complete. There are several reasons for this increased duration. One reason is that the temperatures required for esterification are much higher on the order of 200 to 250 degrees Centigrade than those of other reactions such as free radical polymerization which require temperatures of only 70 to 100 degrees Centigrade. Another reason more time is needed is when higher molecular weight polyesters (such as those greater than 10,000 average number mw) are the goal. With higher molecular weight polyesters when the equivalents of hydroxyl and acid components are closer to being equal, the reaction becomes longer. While initially the reaction proceeds rapidly at first, once reaction temperatures have been reached the reaction starts slowing down as the free acids and hydroxyl groups become less concentrated in the mix. As the reaction slows additional steps and techniques are used to continue the reaction and create larger and larger molecular weights. With very large molecular weights (those greater than 30,000 mw) most often the material is transferred from the original vessel to one where more surface area, heat and/or agitation can be applied. Even larger molecular weights can be obtained by using additional processing steps such as solid state reactions or transesterification.

The following is an excerpt from Organic Chemistry by Morrison and Boyd, pages 679–680, second edition: "In the esterification of an acid, an alcohol acts as a nucleophilic reagent; in hydrolysis of an ester, an alcohol is displaced by a nucleophilic reagent. Knowing this, we are not surprised to find that one alcohol is capable of displacing another alcohol from an ester. This alcoholysis (cleavage by an alcohol) of an ester in called transesterification." "Transesterification is an equilibrium reaction. To shift the equilibrium to the right, it is necessary to use a large excess of the alcohol whose ester we wish to make, or else to remove one of the products from the reaction mixture. The second approach is the better one when feasible, since in this way the reaction can be driven to completion."

When making condensation polyesters, transesterification can be used as an additional processing step to achieve higher molecular weights with already condensed polymers or monomers. At higher temperatures the elimination of an alcohol and subsequent removal of it by vacuum will greatly increase molecular weight. At some point the end group can be liberated and removed by heat and/or vacuum thus building molecular weight. To extend the molecular weight of preformed polymers, transesterification sometimes follows an initial esterification step where the monomer mix, usually containing excess glycols, is first reacted to a point where most of the free carboxylic groups are used up. Or transesterification can be used alone to create polymers where the carboxylic groups have been pre-formed into esters with an easily volatilized alcohol, most commonly methanol. Thus both esterification and transesterification can be used separately or together in the process of making polyesters.

Over the years, many processes have been developed for manufacturing polyesters. In the 1940's it was discovered that polyester polymers could be made having very desirable properties such as clarity and high impact strength through the condensation of aromatic dicarboxylic acids with glycols using high temperatures and long reaction times to achieve higher molecular weights. By far the most important synthetic polyester today is polyethylene terephthalate (PET). This polymer is one where the multifunctional carboxylic acid is a terephthalate or terephthalic acid and the multifunctional alcohol is ethylene glycol. PET is a crystalline polymer that can be used for a variety of items such as film textile, fiber, beverage bottles, and other types of containers.

One method of making PET is to start with dimethyl terephthalate and transesterify with ethylene glycol liberating methanol. As methanol is removed from the process the molecular weight is driven up. Several transesterification catalysts have been used for this method. Due to the environmental problems associated with methanol, it has become more common to use terephthalic acid and ethylene glycol with a suitable esterification catalyst. Again there are a number of such catalysts used.

Esterification of terephthalic acid requires high temperatures, in excess of 200 degrees Centigrade, and long reaction times, sometimes longer than 24 hours. Thus it becomes a very energy intensive polymer to make. When very high molecular weights are needed, 50,000 or greater (which is considered low compared to other polymers), solid state reactors are used to vacuum as much glycol off as possible thus extending the chain length through transesterification and the removal of glycol. Additional heat and time are needed.

The PET manufacturing segment of the polymer industry has become so large that the cost of the raw materials of the PET polymer is low in comparison to other similar performance polymers. Large PET processing lines dedicated entirely to the manufacture of the PET polymers produce PET polymer on a continuous basis. Due to this production there has been a great deal of controversy over the large amounts of PET that are being recovered from post consumer waste streams. Due to this abundance of post consumer waste, there have been a large number of patents issued that concern the utilization of this PET waste. As we progress in the manufacturing techniques for other monomers and the need for higher performance materials become greater we will naturally expect to see the utilization of other condensation polymers to the point where they become prevalent in the waste streams. This has already started to happen with PET containing other barrier materials and with PEN or polyethylene napthalate.

As the waste stream from recycling started producing waste PET in abundance there were several patents written to utilize this potential raw material source. These patents became a technology in their own right. The first approaches to using PET were geared toward breaking down the ester linkages through hydrolysis with water or glycolysis. Glycolysis is a specific form of transesterification where excess glycol is used to degrade the molecular weight. In this way the individual components of the PET can be regenerated. In U.S. Pat. No. 4,078,143 issued to Malik, et al. entitled "Process for depolymerizing waste ethylene terephthalate polyester", a process is described where PET is broken down by glycolysis to bis-(2-hydroxy ethyl) terephthalate, a monomer that can be utilized to reform the PET. In U.S. Pat. No. 4,163,860, issued to Delatte, et al. entitled "Process for obtaining dimethyl terephthalate from polyester scrap" methanol is used to transesterify scrap PET back to dimethyl terephthalate that is purified for use in the PET manufacturing process. In U.S. Pat. No. 4,355,175, issued to Pasztaszeri entitled "Method for recovery to terephthalic acid from polyester scrap", a method of hydrolyzing the PET and purifying and recovering the terephthalic acid is described. In U.S. Pat. No. 4,578,502 issued to Cudmore entitled "Polyethylene terephthalate saponification process", a process is described wherein PET is broken down into its monomeric constituents through saponification with alkali. In U.S. Pat. No. 4,929,749 issued to Gupta, et al. entitled "Production of terephthalate esters by degradative transesterification of scrap or virgin terephthalate polyesters", higher boiling alcohols are used to transesterify the PET into lower molecular weight materials for use as raw materials for the manufacture of other polymers. In U.S. Pat. No. 5,101,064 issued to Dupont, et al. entitled "Production of terephthalate esters by degradative transesterification of scrap or virgin terephthalate polyesters", a process is described where groups having 6–20 carbons are used to degrade the PET, distill off the glycol byproduct, and recover the diester.

In U.S. Pat. No. 5,266,601 issued to Kyber, et al. entitled "Process for preparing polybutylene terephthalate from PET scrap" a method of using PET by glycolysis and ester exchange with 1,4 butanediol and subsequent polycondensation is described. In U.S. Pat. No. 5,319,128 issued to Dupont, et al. entitled "Production of terephthalate esters by degradative transesterification of scrap or virgin terephthalate polyesters" a method of tranesterifying PET using higher molecular weight alcohols with 6 to 20 carbons and then recovering the diesters of terephthalate is described. In U.S. Pat. Nos. 6,031,128 and 6,075,163 issued to Roh, et al. entitled "Process for manufacturing terephthalic acid", a process is described for manufacturing terephthalic acid from waste PET whereby PET is hydrolyzed to disodium terephthalate and then acid neutralized to recover the free terephthalic acid. In U.S. Pat. No. 6,472,557 issued to Pell, Jr. et al. entitled "Process for recycling polyesters", a process for depolymerizing PET to dimethylterephthalate and then hydrolyzing it to terephthalic acid for reuse is described. Although all of these processes work, they are all very energy intensive ways of recycling the PET and do not utilize the time and energy that has already gone into making the PET polyester. More often these processes end up costing as much or even more than the cost of the monomers they are trying to reclaim. This is in large part due to the low cost of ii the beginning PET feed stocks and the refined methods for converting to the starting monomers. Also the additional energy required to reclaim the monomers from recycled PET adds substantially to the cost.

In the techniques used below, it is not necessary to take the PET polymer all the way to its monomeric constituents and thus at least part of the time and energy of conversion of the terephthalic acid and ethylene glycol is conserved. However in all cases the transesterification conversion is done to break down the PET linkages and lower the molecular weight to much lower oligomeric forms prior to subsequent reactions.

There are also a number of methods for the utilization of PET as a raw material for the manufacture of other polymers where terephthalic acid and/or ethylene glycol can be integrated as one of the components. One such area is in the use of PET to make polyols that in turn are used for making urethane foams. In U.S. Pat. No. 4,439,549 issued to Brennan entitled "Novel aromatic polyester polyol mixtures made from polyethylene terephthalate residues and alkylene oxides" a method of reacting PET with glycol to degrade to an oligomeric polyol and then subsequent reaction of the polyol with an isocyanate moiety to produce rigid foam is described. In U.S. Pat. No. 4,469,824 issued to Gigsby, Jr., et al. entitled "Liquid terephthalic ester polyols and polyisocyanate foams therefrom", PET is digested with diethylene glycol and other glycols with some of the ethylene glycol and then removed to form a polyol that reacts with an isocyanate to form a polyisocyanate foam. In U.S. Pat. No. 4,485,196 issued to Speranza in entitled "Liquid phase polyols which are alkylene oxide adducts of terephthalic esters" a technique of making polyols for further processing into urethane foams is described. The polyol is further reacted by ethoxylation or propoxylation to liquefy and inhibit crystallinity. It is then useful for further conversion into polyurethanes. In U.S. Pat. No. 5,948,828 issued to Reck entitled "Technology development and consultancy" reclaimed PET is digested with diethylene glycol, insolubles are removed, and ethylene glycol and free diethylene glycol are removed to achieve a final hydroxyl value for a polyol. In U.S. Pat. No. 6,573,304 issued to Durant, et al. in June of 2003 entitled "Method for obtaining polyols and polyol thus obtained" a process for transesterification with glycols and subsequent removal of free glycols stopping at a narrow molecular weight is described. These methods utilize excess glycol and transesterification to shift the equilibrium back to lower molecular weight entities that can be further processed.

Some techniques developed utilizing PET have at least partially preserved some of the ester moieties and therefore some of the time and energy already used in making the PET. In U.S. Pat. No. 4,977,191 issued to Salsman entitled "Water-soluble or water dispersible polyester sizing compositions", a process is described where other polymers are made by first degrading the PET into oligomers containing the terephthalate moiety and second building back up the molecular weight using other aromatic or aliphatic acids. In U.S. Pat. No. 5,726,277 issued to Salsman entitled "Adhesive compositions from phthalate polymers and the preparation thereof" adhesive compositions are described that are made from PET that is digested or transesterified with glycols and oxyalkylated polyols, either ethoxylated or propoxylated. A similar type of reaction is used in U.S. Pat. No. 5,958,601 issued to Salsman entitled "Water dispersible/redispersible hydrophobic polyesters resins and their application in coatings". In this patent however an ester of a fatty acid and alcohol containing free hydroxyl groups is used in combination with glycols to degrade the PET polymer to lower molecular weight species before a molecular weight buildup is done with additional aromatic acids.

There are additional polymer applications where PET has been used as a raw material as well. In U.S. Pat. No. 5,820,982 issued to Salsman entitled "Sulfoaryl modified water-soluble or water-dispersible resins from polyethylene terephthalate or terephthalates" compositions are described which contain the terephthalate moieties along with sulfonated aromatic groups. Such resins are useful for adhesives, ink resins, dye leveling on polyester and nylon fibers, etc. The process for preparation of these compositions requires a PET glycolysis step followed by additional acids and a molecular weight buildup esterification step. The processing times can be 12 to 24 hours. In U.S. Pat. No. 6,133,329 issued to Shieh, et al. entitled "Thermoplastic polyester resin composition" a composition is described where PET is first digested with a glycol mixture for 3 hours at high temperatures and then reacted with a natural oil for making it compatible with hydrocarbon and hydrofluorocarbon blowing agents. In U.S. Pat. No. 6,512,046 issued to Ueno, et al. entitled "Polymerizable unsaturated polyester resin composition" several compositions are described where PET is first depolymerized to achieve a polyester skeleton, then built back up with a dibasic acid, and further reacted with an unsaturated monomer. In U.S. Pat. No. 6,534,624 issued to Ito, et al. entitled "Process for producing alkyd resins" a process is described where polyester is depolymerized and then esterified in a mixture of alcohols, glycols, fatty acids, etc. It is noted in this patent that the use of terephthalic acid has not been in practice in the past with alkyd technology because this component is more costly than phthalic or phthalic anhydride. Again all of these patents, some very recent, describe first a depolymerization step and then an esterification step to build back up molecular weight to make polymers suitable for other areas of use.

Other techniques deal with the use of reclaimed PET by cleaning up the PET from other wastes and using it as a co-blend prior to or in an extruder with virgin PET or other polymers that can be coextruded with the PET. Once reheated PET loses intrinsic viscosity (I.V.). Intrinsic viscosity has become a much easier method of comparing molecular weights of PET than other more time consuming methods. Once processed, the intrinsic viscosity drops and its use as a feedstock for the original article made becomes limited. In U.S. Pat. No. 5,225,130 issued to Deiringer entitled "Process for reclaiming thermally strained polyester scrap material" mixed streams of recycled PET are cleaned and post condensed with virgin PET. In U.S. Pat. No. 5,503,790 issued to Clements entitled "Method of producing disposable articles utilizing regrind polyethylene terephthalate" recycled PET is used to create articles that are less demanding of higher intrinsic viscosity. In U.S. Pat. No. 5,554,657 issued to Brownscombe, et al. entitled "Process for recycling mixed polymer containing polyethylene terephthalate" a process for recovering PET that involves dissolving the PET from a recycled stream, removing the solvents, and rinsing the PET is described. In U.S. Pat. No. 6,399,695 issued to Moriwaki, et al. entitled "Thermoplastic polyester resin composition" PET is melted with a polyolefin or glycidyl methacrylate to produce a composite material. In U.S. Pat. No. 6,583,217 issued to Li, et al. entitled "Composite material composed of fly ash and waste polyethylene terephthalate" the PET is mixed with the entitled materials and extruded. In the above references no reaction of the PET takes place even though there are subsequent reprocessing steps. There are many other references where recycled PET is cleaned and used as part of the mixture back into articles such bottles, film, etc. Limitations due to the lower intrinsic viscosity of the recycled PET reduce the amount used in critical applications to 5% or less.

There are also current practices where PET is modified by transesterifying with polyethers. These can be glycols or alcohols that have been ethoxylated or propoxylated. These polymers contain the block segments of PET with block segments of the polyethers and thus usually exhibit properties of both. In U.S. Pat. No. 4,785,060 issued to Nagler entitled "Soil release promoting PET-POET copolymer, method of producing same and use thereof in detergent composition having soil release promoting property" PET and a polyoxyethylene polymer are reacted together in a reactor such that an equilibrium is reached. This reaction is based on transesterification of the hydroxyl end groups of the polyether with the ester linkages contained in the PET. In U.S. Pat. No. 6,454,982 issued to Branum entitled "Method of preparing polyethylene modified polyester filaments" a method is described wherein polyethylene glycol is reacted into PET under transesterification conditions and solid stated to a higher intrinsic viscosity.

In the referenced prior art, glycols, polyethers, or simple glycol monoesters are used to degrade or lower the molecular weight of the PET in order to get to monomeric or oligomeric forms of terephthalic acid that can be further utilized as a polyol source for urethanes, to use as adhesive components with glycidyl ethers to form epoxies, or as coatings and/or adhesives.

Another polymer of commerce is polyethylene napthalate PEN. Within the last few years there has been much activity in the use of PET with PEN polymers. This is due in part to better properties such as clarity, strength, and increased crystallinity that translates to better barrier properties obtained with PEN. However, PEN is much more expensive than PET. Therefore, several processes for making copolymers of the two have been developed. In U.S. Pat. No. 5,902,539 issued to Schmidt, et al. entitled "Process for making PEN/PET blends and transparent articles therefrom" a process is described where ethylene glycol is used to reduce the intrinsic viscosity and increase the range of use for PET and PEN copolymers.

The following is an excerpt from U.S. Pat. No. 6,414,063, issued to Bassam, et al. entitled "Nucleated pet/pen polyester compositions".

"It is known that medium content PET/PEN compositions (compositions with PET:PEN ratios around 50:50) are amorphous in nature. The range of compositions which display this amorphous behaviour is generally accepted to be around PET:PEN=20:80 to PET:PEN=80:20, as described by two PEN manufacturers—Shell (see FIG. 1 of presentation to "BevPak" conference, Spring 1995, U.S.A) and Hoechst-Trevira (page 4 of Polyclear.RTM. N technical literature). The disadvantage of this behaviour is that the use temperature of compositions in the 80/20–20/80 region is substantially reduced. The use temperature is dependent on the glass transition temperature (Tg) in this region. In contrast, the use temperature of PET/PEN compositions with <20% PET or <20% PEN is dependent on the crystalline melt temperature (Tm). Tm is over 100.degree. C. higher than the Tg for PET/PEN compositions; hence resulting in the substantial reduction in use temperature observed in the 20/80–80/20 composition region. The same observations on the amorphous/crystalline nature of PET/PEN compositions were also made by Lu and Windle (see FIG. 2 in Polymer 36 (1995), pages 451–459) and Andresen and Zachmann (Colloid & Polymer Science 272 (1994), page 1352). Andresen and Zachmann also found that blends of PET and PEN formed a single phase within 2 minutes of melting. This is usually good evidence for rapid formation of a PET/PEN copolyester by transesterification. Thus the behaviour of PET/PEN blends and copolymers can be expected to be the same with regards to crystallisation during all melt processing operations. In the case of bottle manufacture using PET/PEN copolymers and blends, U.S. Pat. No. 5,628,957

(to Continental PET Technologies Inc.) states that mid-range PET/PEN compositions containing 20–80% PEN are substantially amorphous and describes the use of an additional strain-hardenable (ie. crystallisable) layer for these mid-range PET/PEN bottles."

It is especially interesting to note from this patent that the blends formed a single phase within 2 minutes of melting. Presumably from this and information presented in the description one can surmise that ester compatibility increases the rate of transesterification. Also, it can be inferred that PET and PEN copolymer combinations have been made via melting and/or processing since combinations of the two polymers were started. Again transesterification of the two is the chemisty that makes this happen. In U.S. Pat. No. 6,586,558 issued to Schmidt, et al. entitled "Process for making PEN/PET blends and transparent articles therefrom" glycols are used to lower the intrinsic viscosity and allow more processable viscosities for blends of these two polymers. Again transesterification allows this to occur.

While there has been a lot of activity directed toward utilizing PET as a raw material to manufacture other polymers or as a composite material, PET is not being utilized in these polymers as a raw material. The problems that exist with these prior techniques include raw material contamination, difficulty of reaction, and incompatibility with one or more of the other reactive groups. For instance, in U.S. Pat. No. 5,250,333 issued to McNeely, et al. entitled "Modified polyethylene terephthalate" there is described compositions where other alkoxylated polyols and dicarboxylic acids are used in combination with terephthalic acid and ethylene glycol to produce a less crystalline form of PET. Indeed there are many applications that use terephthalate moieties but require less crystallinity than that of PET. For instance, there are many film applications that require less crystallinity for more elastomeric properties. The polyols mentioned in the previous paragraphs are another example. In U.S. Pat. No. 6,428,900 issued to Wang entitled "Sulfonated copolyester based water dispersible hot melt adhesive" a polyester which contains water dispersible sulfonated branched copolyester polymers is described. These copolyester polymers use difunctional carboxylic acids like terephthalic acid in their makeup. Crystallinity would inhibit water redispersibility which is an important aspect of the disclosure. In U.S. Pat. No. 6,555,623 issued to Yang, et al. entitled "Preparation of unsaturated polyesters" a process is described where MPD (methyl propanediol) is used along with aromatic diacids such as terephthalic acid and maleic anhydride to produce unsaturated polyesters suitable for further reaction through the unsaturated group. Again polymer crystallinity is to be avoided.

There are a number of polymers that currently utilize phthalic anhydride as a preferred difunctional aromatic acid. One reason for this is that for practical considerations one of the acid groups has already been reacted and is an anhydride. This lowers the weight percent needed in the subsequent polymers being made. In addition phthalic anhydride esterifies at lower temperatures than terephthalic acid. Using terephthalic acid as an alternate would not be as economical to begin with. But terephthalic acid could be used if the right process to use recycled PET were available that would eliminate this economical difference.

There are a number of polymers containing ester linkages and the number and scope of polymers that utilize or could utilize the raw materials that make up PET or other condensation polymers of commerce are too numerous to list within the scope of this write. The following broad based articles of commerce all use or have used terephthalic acid (or aromatic acids like phthalic acid or anhydride) and/or ethylene glycol in their monomer makeup:

(1) Adhesives: either hot melt, water borne, or reactive;
(2) Ink resins: both as the binding agent and the carrier vehicle;
(3) Unsaturated resins: alone or in combinations with reactive diluents such as acrylics or styrene for composite mixtures with fiberglass, carbon fiber, etc.;
(4) Alkyd resins: both long and short alkyds for coatings and paint applications;
(5) Urethanes: As the polyol portion together with isocyanates to form adhesives, structural resins, or foams;
(6) Films: Less crystalline films for shrink wrap, laminating, etc.; and
(7) Polyols for powder coatings or fusable coatings.

As seen in the prior art, PET (either virgin or recycled) is recognized as a material that can be used to make more PET, PET composites, or other polymers that contain terephthalate groups. The processes that have been used to accomplish this contain within their steps glycolysis (or hydrolysis) of the ester linkages to create the beginning monomers such as terephthalic acid, or a much lower molecular weight terephthalate oligomer that can be reacted to generate more PET or other polymers through esterification. In no circumstance has there been activity that indicates advantage taken of the high molecular weight of PET (polyester polymers) being used to build higher molecular weight, on the order of 10,000 to 20,000, through transesterification with a lower molecular weight polyester.

The present process however does. The process of the present invention is a two-step process that can be used to take full advantage of the high molecular weight of the precondensed polymer, like PET, itself to produce a high molecular weight polymer. The first step, which involves no polymer of commerce, takes all the other monomers that are to be contained within the finished polymer, and reacts them to form a modifying polymer containing terminal hydroxyl or carboxyl groups. In the second step a commercially available condensation polymer is transesterified with the modifying polymer using heat and agitation to form the finished polymer. At suitable temperatures as will be herein discussed, the second step occurs very rapidly (on the order of approximately one-half of the current process) and can be performed in any vessel such as an extruder set up for reactive extrusion that can be heated to suitable transesterification temperatures, usually 230 to 270 degrees Centigrade for PET. The advantages of this process are to reduce the manufacturing time to a time on the order of approximately one-half of the current process and to produce a higher molecular weight polymer, on the order of greater than 192 g/mol, which relates to the decreasing time in a decreasing log/log curve of molecular weight versus time for direct esterification.

SUMMARY OF THE INVENTION

It is an object of the present invention to provide a novel process for manufacturing a polymer.

Still another object of the present invention is to provide a novel process for manufacturing a polymer from PET or PEN.

An additional object of the present invention is to provide a novel process for modifying PET or PEN.

Yet another object of the present invention is to provide a novel process for modifying PET or PEN without degradation to form a higher molecular weight polymer.

It is an additional object of the present invention to provide a novel process for modifying PET or PEN by synthesizing a modifying polymer from a plurality of appropriate monomers.

Still an additional object of the present invention is to provide a novel process for modifying PET or PEN by transesterifying the modifying polymer with the PET or PEN.

In satisfaction of these and related objectives, Applicant's present invention provides a process for manufacturing a polymer from PET or PEN. The process involves modifying PET or PEN without degradation by first synthesizing a modifying polymer from a plurality of appropriate monomers and second transesterifying the modifying polymer with the PET or PEN to form a higher molecular weight polymer.

DETAILED DESCRIPTION OF THE PREFERRED EMBODIMENT

The term "modifying polymer" for purposes of this patent is defined as a polymer, not necessarily a polyester polymer, used to modify through transesterification a PET, PEN, or other polymer of commerce to achieve a new polymer with new desired properties.

In the process disclosed herein two steps are used. The first step is the manufacture of a modifying polymer containing the desired ingredients not derived from the commercially available condensation polymer itself. This differs substantially from the other techniques described that utilize PET in that the first step itself does not involve the PET or the monomers that make up PET. This first step of the reaction of the present invention to achieve a modifying polymer reduces the condensation or esterification reactions to only those that are different from the condensation polymer of the second step thereby having lower energy requirements and lower toxic waste stream condensation products. Also, where less crystalline aromatic polymers are desired, the condensation of other aromatic acids to form the modifying polymer is much less energy consumptive than the condensation of terephthalic acid as in the case of PET. In addition, if the goal is to produce a polyol or alkyd, then the modifying polymer reaction proceeds extremely rapidly on the order of a few hours due to the excess of hydroxyl components to acid components. This is in itself a much more rapid condensation than a polymer whose carboxyl and hydroxyl functions are more closely equal, which could take more than 24 hours. Where aliphatic acids for the polymer constituents are used at a temperature range from 150 to 250 degrees Centigrade, the reaction is further shortened due to the higher reaction rates, sometimes double that of aromatics. With the use of terephthalic acid at a temperature of 190 to 270 degrees Centigrade, a reasonable reaction rate can also be obtained.

The second step of the present process is the rapid transesterification of a commercially available condensation polymer with the modifying polymer produced in the first step. Careful monitoring of temperatures and reaction rates are not necessary with the only requirement being enough heat to transesterify the two polymers in a given length of time because if heating is a problem, the reaction time can be increased. Higher temperatures will greatly reduce the time required. Reaction rates are dependent on several factors including (1) time, (2) temperature, (3) modifying poloymer molecular weight, (4) hydrophilicity of modifying polymer, (5) number and type of hydroxyl functionality on modifying polymer, and (6) transesterification catalyst.

Therefore, good transesterification of terephthalates starts around 200 degrees Centigrade, greatly accelerates around 240 degrees Centigrade, and is very rapid around 260 degrees Centigrade. Reaction time at 200 degrees Centigrade is about ten hours to transesterify PET with a glycol. Reaction rate is reduced to about one hour at 240 degrees Centigrade and only fifteen minutes at 260 degrees Centigrade. In an extruder, heating is not an issue so one can heat to 300 degrees Centigrade and transesterify even quicker. With a more hydrophobic modifying polymer and secondary hydroxyl groups, these times would be longer. Thus, a rapid reaction rate can be achieved in the first step if the modifying polymer is lower molecular weight than the commercially available condensation polymer or if it contains monomers whose reaction temperatures are lower than that of the condensation polymer. In this regard it becomes easier to consider the transesterification step as the molecular weight building step for the lower molecular weight polymers. Even if the objective is higher molecular weights it is still far easier to esterify a smaller batch given the charging, heat up cycles, etc. than any of the current processes or techniques currently utilizing condensation polymers of commerce such as PET.

Transesterification is a reaction that takes place when a group such as an alcohol or amine becomes a nucleophile and exchanges take places at the ester linkage. This group can come from any molecule and is not limited to a simple molecule such as a carbon chained alcohol with 6 to 12 carbons, a glycol with 6 to 20 carbon atoms or an amine with 2 to 20 carbon atoms. Indeed a polymer containing these groups can be made to react by first transesterifying ester groups contained on a premanufactured polyester such as PET or PEN. However, since transesterification continuously occurs above the polymers Tg (glass transition temperature), the alcohol generated from the nucleophile displacement itself becomes a nucleophile that can further react. In this way at some point equilibrium is reached where no further change in the polymer mixture occurs and the mixture becomes a homogeneous new polymer. If the mixture contains polymer segments that for some reason do not participate in the transesferification reactions, then the new polymer becomes a copolymer of the two beginning polymers. If the mixture contains segments that participate more or less equally in the tranesterification process, then the product becomes more or less a homogeneous polymer with completely new properties.

One of the parameters important to control in polymer synthesis is molecular weight. With the manufacture of esters, the molecular build up is rapid initially and slows down considerably as the molecular weight increases. With the present process the final molecular weight is controlled by the molecular weight of the modifying polymer and the percentage of that modifying polymer reacted with the commercially available condensation polymer. For instance, if PET is used as the commercially available condensation polymer and its quantity is held constant, then the molecular weight of the finished polymer is solely dependent on the molecular weight of the modifying polymer. In this way polymers of lower molecular weight than the commercially available condensation polymer, especially in the range of less than 15,000, become extremely quick to manufacture compared to other techniques (approximately one-half the time as other techniques).

The second step of the present process can be done in the same manufacturing vessel or any suitable closed vessel separate from the vessel used to manufacture the modifying polymer. In some instances the second step does not require the condensers or condensation receivers that are required in the first step and so less expensive equipment can be used. In fact it is possible to do the second step in an extruder set up for the needed dwell times and agitation required.

If no condensate is removed from the second step reaction, no venting or condensers are required. In this way once transesterification has reached an equilibrium, the molecular weight achieved is the average of the mole content of the reactants in the beginning mixture of the second step. By first calculating the desired final molecular weight, the final weight can be achieved without further esterification which is the major time consuming step in high molecular weight polyester synthesis. Advantages of this present process are therefore lower reaction times (approximately one-half of current processes), lower waste streams, higher utilization of the commercially available condensation polymer, and higher finished molecular weights with less energy and time.

The process of this invention eliminates many of the problems associated with the prior art. For instance as stated in much of the prior art the digestion of PET to reconstitute the original starting materials is in many cases more expensive than the cost of manufacturing the starting materials. Once digested, the materials have to be re-condensed which is inherently energy inefficient and produces toxic levels of glycol and dioxane in the waste stream. Thus, only small amounts of PET are reprocessed in this manner. The present process eliminates these problems since it preserves the ester linkages already formed in the commercially available condensation polymer so that re-condensation of precursor materials is unnecessary.

The high heat and duration of esterification make the manufacturing of unsaturated resins using PET, as mentioned in the prior art, a very sensitive process. In many instances a polyester precursor is made first and maleic anhydride is added, reacted in, and brought up to temperatures that over time allow some isomerization of the maleic ester groups to fumaric ester groups to occur. The process described in the present application allows for the rapid transesterification of PET and isomerization of maleic groups to occur simultaneously.

EXAMPLE 1

Water Dispersible Polyester Resins

Water soluble or dispersible resins are used in a wide variety of applications such as coatings and ink carrier vehicles. Water dispersible polyesters have become popular in recent years. These resins are solublized using a number of techniques. Generally an end group, such as a carboxylic acid, that can be subsequently neutralized is used. There are certain monomers that can also afford water dispersibility, such as sodium sulfoisophthalic acid (SIP). In the following examples we compare current techniques of reacting SIP into polyesters with the process of the present application.

The following example is taken from the section of preferred embodiment for U.S. Pat. No. 5,820,982 entitled "Sulfoaryl modified water-soluble or water-dispersible resins from polyethylene terephthalate of terephthalates" issued to Salsman in October of 1998:

"EXAMPLE 6

The following ingredients are used:

| Ingredient | % weight | g |
|---|---|---|
| SIPEG (A) | 30 | 135 |
| Ethox 2988 | 5 | 22.5 |
| Na-Acetate | 0.5 | 2.25 |
| Fascat ™ 2001 | 0.1 | 0.45 |
| PET | 23.11 | 104 |
| PA | 41.29 | 185.8 |
| Total | 100% | 450.00 g. |

All ingredients except PA are charged into a reactor and heated to 205 degrees Centigrade. The resulting mixture is heated to 220 degrees Centigrade, then cooled to 190 degrees Centigrade and tested on clear peel test. PA is charged into the reactor and the mixture continued to cool down. Next day the mixture is heated up to 200 degrees Centigrade for about 8 hours. When AV reaches 14.3 the mixture is dilated to 30% to good particle size.

In this example PET is used in the reaction and broken down by the initial charge of hydroxyl-terminated materials. The SIPEG is a grade of SIP from DuPont where the sulfoisophthalic is pre-reacted with ethylene glycol resulting in two hydroxyl terminations. The PA or phthalic anhydride is used to build back the molecular weight to suitable size for film formation. The total reaction time in the flask is about 2 work days or 16 hours."

For comparison the same ingredients are used in present disclosure where a modifying polymer is first made and then reacted rapidly with the PET:

| Ingredient | Percent | Amt (in grams) |
|---|---|---|
| Modifying Polymer | | |
| SIPEG | 30.00 | 63.00 |
| Ethox 2988 | 5.00 | 10.50 |
| Na-Acetate | 0.50 | 1.05 |
| Phthalic Anhydride | 41.29 | 86.71 |
| Fascat ™ 2001 | 0.10 | 0.21 |
| Tyzor ™ TPT | 0.02 | 0.04 |
| Commercially Available Condensation Polymer: | | |
| PET | 23.09 | 48.49 |
| Total | 100.00 | 210.00 |

A small amount of Tyzor™ TPT was added at the end of the modifying polymer stage in order to insure that enough tranesterification catalyst was present for the process of this disclosure. All the ingredients were combined in a 250 milliliter flask fitted with a condenser, a thermometer, a pipet for the introduction of an inert gas, an agitator, and a heating mantel with a scale controlled rheostat.

| Time | Temp (° C.) | Observations |
|---|---|---|
| 8:16 a | RT | All ingredients charged except TPT and PET, 80% |
| 8:40 a | 146 | Clearing, used agitation and inert blanket |
| 9:00 a | 160 | Water coming over, cut back to 45% |

-continued

| Time | Temp (° C.) | Observations |
|---|---|---|
| 11:08 a | 182 | Water slowing, up to 60% |
| 11:31 a | 198 | Water still slowing |
| 11:50 a | 220 | Water almost stopped, added TPT and PET, 80% |
| 12:15 p | 250 | All PET in, cut to 70% |
| 12:30 p | 250 | Cooled, A.V. < 5.0 |

In this case because the mixture contains ethylene glycol the reaction was slowed down to prevent the ethylene glycol from coming over with the water. The finished resin was a clear tough solid that was readily dispersible in hot water. The total time for this process was 4 hours and 15 minutes. Much less than the 16 hours of the example of U.S. Pat. No. 5,820,982.

EXAMPLE 2

Adhesive Compositions

In the manufacture of adhesives the greatly reduced cycle times become even more of an issue since the rate determining step of high molecular weights that are needed for good bond strength require long reaction times. Using the approach in the present process and even with a required slightly higher molecular weight modifying polymer a range of high equivalent ratios of hydroxyl component polymers can be made. The second step of the present process, the transesterification step, is only slightly longer (in the range of minutes instead of hours) than for lower molecular weight polymers.

Three hot melt adhesive compositions were prepared, two by prior art methods and one using the process disclosed in this patent application. The main purpose is to show the significant difference in processing times with the herein disclosed process over the prior art processes. A small 250 ml round bottomed flask was used in all cooks.

Sample 1 (Prior Art Method): All virgin raw material were used and straight esterification was performed to condense all the raw materials. The following reaction was performed.

| Ingredient | Percent | Amt (in grams) |
|---|---|---|
| Peg 400 | 9.69 | 20.35 |
| Diethylene Glycol | 23.90 | 50.19 |
| Trimethylol Propane | 14.62 | 30.70 |
| Phthalic Anhydride (PA) | 46.60 | 97.86 |
| Adipic Acid | 5.11 | 10.73 |
| Fascat ™ 4100 | 0.08 | 0.17 |
| Total | 100 | 210.00 |

All the ingredients were combined in a 250 milliliter flask fitted with a condenser, a thermometer, a pipet for the introduction of an inert gas, an agitator, and a heating mantel with a scale controlled rheostat. At a later step vacuum was applied using a suitable vacuum pump with connecting hose.

Note: Fascat™ 4100 is a monobutyl stannoic acid catalyst for esterifications made by Atofina™. Phthalic anhydride was used in this cook due to its lower cost and ease of reaction over terephthalic acid; however, in terms of performance for the end product application terephthalic acid is preferred.

| Time | Temp (° C.) | Observations |
|---|---|---|
| 8:35 a | RT | All ingredients charged. Heater set at 80%. |
| 8:55 a | 98 | Ingredients melted. Began agitation and inert blanket. Set Control on 44% to control reaction. |
| 9:35 a | 160 | Distillate began coming over. |
| 12:05 p | 180 | Distillate slowing down. Set control to 50% |
| 1:35 p | 220 | Set control to 60%. Began inert gas sparge. |
| 3:38 p | 240 | Began vacuum. Pulled 25 inch vacuum for one hour. |
| 4:44 p | 240 | Vacuum cut and product tested. |
| Total Cook Time: 8 hrs. 9 min. | | |

The product was suitably tacky and had the resilience of a higher molecular weight polymer. The Gardner Holdt Viscosity was T at 60%. The adhesion was very good.

Sample 2 (Prior Art Method): The process was used where some PET is broken down into oligomer segments and used to replace some of the aromatic acids. Next, the polymer is built back up using esterification. The following reaction was performed:

| Ingredient | Percent | Amt (in grams) |
|---|---|---|
| Peg 400 | 9.13 | 19.17 |
| Trimethylol Propane | 30.70 | 64.47 |
| PET pellets | 45.57 | 95.70 |
| Tyzor ™ TPT | 0.02 | 0.04 |
| Terephthalic Acid | 14.50 | 30.45 |
| Fascat ™ 4100 | 0.08 | 0.17 |
| Total | 100 | 210.00 |

All the ingredients were combined in a 250 milliliter flask fitted with a condenser, a thermometer, a pipet for the introduction of an inert gas, an agitator, and a heating mantel with a scale controlled rheostat. At a later step vacuum was applied using a suitable vacuum pump with connecting hose. Note: Tyzor™ TPT is a Dupont tetrapropyltitanate catalyst that is known to be effective in transesterification reactions.

| Time | Temp (° C.) | Observations |
|---|---|---|
| 8:26 a | RT | Peg 400, and TMP charged. Control set at 80%. |
| 8:50 a | 80 | Ingredients melted. Began agitation and inert blanket. |
| 9:41 a | 200 | Added TPT and a third, 15 grams, of PET. |
| 10:01 a | 240 | Added a third, 15 grams, of PET. |
| 10:20 a | 240 | Added last third, 15.57 grams, of PET. |
| 10:43 a | 250 | Hold for thirty minutes at 250 Centigrade. |
| 11:15 a | 250 | Turned off heat and allow to cool down. |
| 12:30 p | 200 | Added Terephthalic acid and Fascat ™ 4100. Set control to 50%. |
| 1:30 p | 190 | Water coming over. |
| 6:25 p | 220 | Set up vacuum at 25 inches for 1 hour, set control at 55%. |
| 7:25 p | 240 | Finished |
| Total Cook Time: 10 hrs. 59 min. | | |

Some of the additional reaction time over the first example was due to the use of terephthalic acid. If phthalic anhydride were used instead, based on previous work, the reaction should run 3 to 4 hours less.

The product was suitably tacky and had the resilience of a higher molecular weight polymer. The Gardner Holdt Viscosity was U+ at 60%. The adhesion was very good.

Sample 3 (Present Method): All other ingredients of a final polymer were reacted together to form a modifying polymer through esterification, except PET. Next, transesterification of PET was used to build molecular weight to form a final polymer.

| Ingredient | Percent | Amt (in grams) |
|---|---|---|
| Modifying Polymer: | | |
| Peg 400 | 3.63 | 7.62 |
| Diethylene Glycol | 1.82 | 3.82 |
| Trimethylol Propane | 17.20 | 36.12 |
| Adipic Acid | 12.29 | 25.81 |
| Fascat ™ 4100 | 0.08 | 0.17 |
| Tyzor ™ TPT | 0.02 | 0.02 |
| Commercially Available Condensation Polymer: | | |
| PET | 64.96 | 136.42 |
| Total | 100 | 210.00 |

All the ingredients were combined in a 250 milliliter flask fitted with a condenser, a thermometer, a pipet for the introduction of an inert gas, an agitator, and a heating mantel with a scale controlled rheostat. No vacuum step was needed to increase the molecular weight.

Note: In this process the Fascat™ 4100 is used first for esterification of the modifying polymer and then the TPT is used for transesterification of the modifying polymer with the commercially available condensation polymer.

| Time | Temp (° C.) | Observations |
|---|---|---|
| 8:29 a | RT | Peg 400, DEG, TMP, adipic acid, and Fascat ™ 4100 charged, control set at 80%. |
| 8:45 a | 90 | Ingredients melted. Began agitation and inert blanket. |
| 9:05 a | 170 | Condensate coming over. |
| 10:10 a | 220 | Condensate almost stopped. A.V. of less than 3.0 |
| 10:20 a | 240 | Added Tyzor ™ TPT and first third, 45 grams, of PET. |
| 10:43 a | 250 | All clear and liquid. Added second third, 45 grams, of PET. |
| 11:03 a | 250 | All clear and liquid. Added last third, 46.42 grams, of PET. |
| 11:50 a | 250 | Held thirty minutes after reaching 250 degrees Centigrade. Cooled. Tyzor ™ TPT added. |
| Total Cook Time: | | 3 hrs. 19 min. |

The product was suitably tacky and had even more resilience, as indicated by its recovery rate after manually stretching, than either of the two previous cooks indicating an even higher molecular weight polymer than the prior samples. The Gardner Holdt Viscosity was X+ at 60% again indicating a higher molecular weight than either of the previous processes. The adhesion to a paper substrate was very good and required more force to tear apart as evident by the large amount of fiber tear observed over the previous examples.

EXAMPLE 3

Film Compositions from Polyethylene Napthalate (PEN)

In the production of films it is essential that the viscosity, resiliency, or other properties of the molten resin be high enough to hold a sheet through a drop zone when forming or laminating. With many films a certain degree of cross-link density is incorporated into the polymer to achieve this. It becomes necessary at times to approach the gellation point of the polymer in order to achieve these running properties. With the disclosed procedure one can approach the gellation point by selecting the right cross-link density in the modifying polymer achieving unheard of properties with great accuracy. In fact in many cases gellation is a necessary property to achieve high strengths and cohesive properties. With this process and the proper choice of beginning multifunctional alcohols or acids, gellation can be achieved with large quantities of the commercially available condensation polymer.

PEN is a relatively new polymer that has come into being in the last few years. Prior to the construction of a manufacturing site by Amoco specifically for the manufacture of NDC, or dimethyl-2,6-naphthalenedicarboxylate the intermediate for PEN, the cost was prohibitive for all but the most demanding applications. Now however many items of commerce are using PEN.

There are advantages of using PEN over PET for packaging of certain articles. For example the barrier properties of PET are not good enough for certain applications where barrier are necessary. PET has been used for bottling beer but because of the high permeability of oxygen it causes the flavor to deteriorate rapidly. There have been several products where PET is laminated with a high oxygen barrier film to try to compensate for this. PEN has the needed barrier properties. This and the fact that it can take higher temperatures that are used to pasteurize some liquids, it is expected that the use of PEN will increase over the next decade.

The process of the present invention can use PEN as the commercially available condensation polymer. The required temperatures to produce this polymer are slightly greater on the order of 250 to 270 degrees Centigrade.

| Ingredient | Percent | Amt (in grams) |
|---|---|---|
| Modifying Polymer | | |
| Peg 400 | 53.46 | 112.27 |
| Diethylene Glycol | 16.28 | 34.19 |
| Adipic Acid | 30.11 | 63.23 |
| Fascat ™ 4100 | 0.12 | 0.25 |
| Tyzor ™ TPT | 0.03 | 0.06 |
| Total | 100 | 210 |

All the ingredients were combined in a 250 milliliter flask fitted with a condenser, a thermometer, a pipet for the introduction of an inert gas, an agitator, and a heating mantel with a scale controlled rheostat.

| Time | Temp (° C.) | Observations |
|---|---|---|
| 8:33 a | RT | All above ingredients except Tyzor ™ TPT, 80% |
| 8:58 a | 100 | All melted, agitate and inert gas |
| 9:31 a | 170 | Condensate over, set at 65% |
| 11:15 a | 225 | Condensate slowed almost to stop, A.V. < 3.0, removed all but 42 grams from flask, added TPT, 80% |

The following combination was used for the final polymer:

| Ingredient | Percent | Amt (in grams) |
|---|---|---|
| Modifying Polymer | 20 | 42 |
| PEN | 80 | 168 |

| Time | Temperature | Observations |
|---|---|---|
| 11:25 a | 250 | Added 20 grams of PEN |
| 11:39 a | 265 | Cleared, added 30 grams of PEN |
| 11:59 a | 265 | Cleared, added 50 grams of PEN |
| 12:33 a | 265 | Cleared, added 68 grams of PEN |
| 1:45 a | 265 | Cleared |

Finished product was a clear, stretchy material. When poured out onto a Teflon™ sheet the material had the characteristics of the shrink wrap used in the packaging industry. Considering the content of PEN, this film should have superior barrier properties.

EXAMPLE 4

Polyester Polyols

It has been shown in the prior art that PET can be broken down through glycolysis with various types of glycols to a polyol that is then further reacted with propylene or ethylene oxide to make these polyols PET-containing less crystalline and aid in the handling by lowering the viscosity of the resulting liquid. The liquid polyols are usually used to make more pliable or flexible types of finished materials such as foam for backing various substrates, foam for furniture cushions, automotive seats, etc. But there are some liquid polyols that create rigid foams as well. The need for non-crystallizing material to make polyols requires further processing with ethylene oxide or propylene oxide units to achieve the desired end product.

Harder more crystalline polyols can be made that are suitable for further reaction with diisocyanate prepolymers or epoxy containing polymers to make hard coatings for appliances, automotive finishes and the like that are formed by heating up or baking the polyol powder until it fuses and becomes a coating. In the process, there are many environmental aspects of having materials with low VOC's and containing no solvents that need to be removed. These are collectively referred to as powder coatings because they are normally in the form of powders ready for use.

In the prior art, several types of polyester polyols have been made using PET as a raw material. Polyols are useful components of a number of different compounds. These include, but are not limited to, surfactants, different types of polyurethanes from foam to thermoplastic elastomers, and adhesives or coatings.

The present process is especially useful for the preparation of polyols with a wide variety of properties. Furthermore, when using an extruder for the second step, the rapid transesterification step, the procedure is especially useful as a means of making and utilizing polymers of high viscosity or high crystallinity which are impossible to utilize with other polymerization technologies that require isolation prior to use, such as high molecular weight polyurethanes. To make high molecular weight polyurethanes liquid polyols are mixed with close to stoicheiometric equivalents of diisocyanate compounds and allowed to react. The isocyanate groups react with the alcohol groups of-the polyols and extend the chain with the resulting urethane linkages. Due to the relatively low molecular weights of the starting polyols often the mixtures contain 30 to 50 percent of the isocyanate compound. In contrast, with the present process, it is possible to create high molecular weight polyols with wide ranges of amorphous and crystalline segments. With the polyol component at higher molecular weights, the isocyanate component can be reduced to very low levels, often less than 1% of the total.

Three different polyols were made using the present procedure with varying molecular weights and degrees of crystallinity. A small 250 ml round bottomed flask was used in all cooks.

Polyol Sample 1:

| Ingredient | Percent | Amt (in grams) |
|---|---|---|
| Modifying Polymer: | | |
| Peg 400 | 39.80 | 83.58 |
| Diethylene Glycol | 10.60 | 22.26 |
| Adipic Acid | 14.60 | 30.66 |
| Fascat™ 4100 | 0.08 | 0.17 |
| Tyzor™ TPT | 0.02 | 0.04 |
| Commercially Available Condensation Polymer: | | |
| PET | 34.90 | 73.29 |
| Total | 100.00 | 210.00 |

All the ingredients were combined in a 250 milliliter flask fitted with a condenser, a thermometer, a pipet for the introduction of an inert gas, an agitator, and a heating mantel with a scale controlled rheostat. No vacuum step was used.

Note: In these examples, the Fascat™ 4100 is used first for esterification of the modifying polymer. Next, the TPT is used for transesterification of the modifying polymer with the commercially available condensation polymer of commerce.

| Time | Temp (° C.) | Observations |
|---|---|---|
| 8:14 a | RT | Peg 400, DEG, Adipic acid, and Fascat™ 4100 charged, control set at 80%. |
| 8:35 a | 100 | Ingredients melted. Began agitation and inert blanket. |
| 9:01 a | 170 | Condensate coming over. |
| 9:15 a | 190 | Condensate over too fast, cut back to 60% |
| 10:20 a | 220 | Condensate almost stopped. A.V. less than 5 |
| 10:32 a | 240 | Added TPT and all of PET |
| 10.48 a | 250 | All clear and liquid. Clear pill of 30 minutes |
| Total Time | | 2 Hours and 34 minutes |

The product was a clear, slightly viscous liquid at room temperature.

Polyol Sample 2:

In this example only the amounts of Peg 400 and adipic acid were changed. However, this represented a change in the modifying polymer from an equivalent excess of hydroxyls of 0.995 to 0.39. This shifts the molecular weight up considerably, as indicated by the increase in viscosity from 15 poise at 175 degrees Centigrade to 35 poise at 175 degrees Centigrade, while reducing the hydroxyl content of the finished polyol.

| Ingredient | Percent | Amt (in grams) |
| --- | --- | --- |
| Modifying Polymer: | | |
| Peg 400 | 34.80 | 73.08 |
| Diethylene Glycol | 10.60 | 22.26 |
| Adipic Acid | 19.60 | 41.16 |
| Fascat ™ 4100 | 0.08 | 0.17 |
| Tyzor ™ TPT | 0.02 | 0.04 |
| Commercially Available Condensation Polymer: | | |
| PET | 34.90 | 73.29 |
| Total | 100.00 | 210.00 |

All the ingredients were combined in a 250 milliliter flask fitted with a ii condenser, a thermometer, a pipet for the introduction of an inert gas, an agitator, and a heating mantel with a scale controlled rheostat.

| Time | Temp (° C.) | Observations |
| --- | --- | --- |
| 12:35 p | RT | Peg 400, DEG, Adipic Acid, and Fascat ™ 4100 charged. Heater set at 80%. |
| 12:55 p | 100 | Ingredients melted. Began agitation and inert blanket. |
| 1:26 p | 170 | Distillate began coming over. Set heater to 60%. |
| 3:20 p | 220 | Condensate almost stopped. A.V. < 3.0 |
| 3:35 p | 230 | Added all TPT and PET. Set control to 80% |
| 4:16 p | 250 | All clear. |
| Total Cook Time: 3 hrs. 41 min. | | |

This polyol was clear and much more viscus than Polyol Sample 1. This is due to the higher molecular weight.

Polyol Sample 3:

In this example the same percentage of ingredients are used to make the modifying polymer as in Polyol Sample 2. However, the amount of the commercially available condensation polymer, i.e. PET, is changed so that the finished polyol contains 50%, and not 34.90% of the PET. Since the PET is of higher molecular weight than that of the modifying polymer, the molecular weight is increased substantially from the PET upon reaction with subsequent changes in properties expected of higher molecular weight polymers.

| Ingredient | Percent | Amt (in grams) |
| --- | --- | --- |
| Modifying Polymer: | | |
| Peg 400 | 26.70 | 56.07 * |
| Diethylene Glycol | 8.14 | 17.09 |
| Adipic Acid | 15.06 | 31.63 |
| Fascat ™ 4100 | 0.08 | 0.17 |
| Tyzor ™ TPT | 0.02 | 0.04 |
| Commercially Available Condensation Polymer: | | |
| PET | 50.00 | 105.00 |
| Total | 100.00 | 210.00 |

* Note
In order to allow the catalysts, Fascat ™ 4100 and Tyzor ™ TPT, to remain constant a slight adjustment was made in the quantity of Peg 400 used.

All the ingredients were combined in a 250 milliliter flask fitted with a condenser, a thermometer, a pipet for the introduction of an inert gas, an agitator, and a heating mantel with a scale controlled rheostat.

| Time | Temp (° C.) | Observations |
| --- | --- | --- |
| 8:21 p | RT | Peg 400, DEG, Adipic Acid, and 4100 charged. Heat set at 80%. |
| 8:40 p | 100 | Ingredients melted. Began agitation and inert blanket. |
| 9:08 p | 170 | Condensate coming over, back to 60%. |
| 10:31 p | 222 | Condensate stopped. A.V. < 3.0, back to 80% |
| 10:45 p | 250 | Added 50.0 grams of PET. |
| 11:05 p | 250 | Added 55.0 grams of PET. |
| 11:30 p | 250 | Clear melt. |
| 11:45 p | 250 | Finished and cooled. |
| Total Cook Time: 3 hours 24 minutes | | |

At this point the product was cooled and was a tacky solid at room temperature indicative of a much higher molecular weight. Also it crystallized overnight so the crystallinity with this much PET is high. In production of high PET content urethanes as in the following examples it would not be necessary to isolate this material.

EXAMPLE 5

Polyester Polyols used to Make Polyurethanes

As presented in Polyol Samples 1–3, polyols are reacted with near stoichiometric amounts of diisocyanate compounds to yield polyurethanes that can be used for foam, adhesives, or other elastomeric compounds. The polyols of the present process are especially suitable to rapid modification of polyurethanes to suit a wide range of finished properties. In addition, the higher molecular weights that can be easily obtained can produce rare properties with very small amounts of diisocyanate compounds because of the higher ratio of polymer to isocyanate components the finished polyurethanes can take on properties more like the polyester and less like the isocyanates. These properties could include crystalline and non-crystalline phases within the same polymer structure resulting in a combination of properties such as rigidity and impact strength that have not been achieved with past polyurethane systems.

In the following examples polymethylene polyphenyl isocyanate (PAPI) was used as the diisocyanate compound. It has low volatility and is therefore safer to use than standard methylene phenyl diisocyanate (MDI) one of the more common isocyanates used. The isocyanate index of PAPI 27 from DOW™ is stated to be 300. This value is used to establish combining weights with other reactive groups. It is common practice to use a slight theoretical excess of isocyanate, usually 3–5% for flexible foams. Also, water is commonly used as a foaming agent in these types of mixes. The isocyanate reacts with the water creating carbon dioxide that then expands and creates the foam. The quantity of isocyanate compound used for this purpose must also be taken into account.

Polyurethane Example 1

Using Polyol Sample 1 since the equivalents of diethylene glycol and adipic acid are equal the equivalents of Peg 400 can be used to calculate the equivalents of hydroxyl components and the hydroxyl number. The hydroxyl number for this polyol is 111.6. This value is calculated by either 1) calculating the hydroxyl value of the beginning mixture and subtracting the calculated beginning acid value and then adding back the measured final acid value, or 2) using conventional techniques with anhydrides and back calculations by titration of remaining acid values.

Once this value is obtained, it is divided by the isocyanate index to obtain the combining ratio.

111.6÷300=0.372×100=37.2 grams of PAPI per 100 grams of Polyol Sample 1+37.2×4%=38.7 grams per 100

Using 1 gram of water for the foaming agent an amount of 14.4 grams of PAPI was added for conversion to carbon dioxide to create the foam.

So the following ratio amounts were combined in a cup and allow to react:

| | |
|---|---|
| Polyol Sample 1 | 100 grams |
| PAPI | 38.7 grams |
| Water | 1.0 grams |
| PAPI for water | 14.4 grams |
| DBTL | 0.1 grams |

The di-butyl tin laurate (DBTL) is added to help catalyze the reaction. Other catalysts such as amines are commonly used to speed up the reaction. This produced a nice foam that expanded and became slightly rigid and very tough after curing.

Polyurethane Example 2

Using Polyol Sample 2, since the equivalents of diethylene glycol and adipic acid are equal the equivalents of Peg 400 can be used to calculate the equivalents of hydroxyl components and the hydroxyl number. The hydroxyl number for this polyol is 97.6. This value is calculated by either 1) calculating the hydroxyl value of the beginning mixture and subtracting the calculated beginning acid value and then adding back the measured final acid value, or 2) using conventional techniques with anhydrides and back calculations by titration of remaining acid values.

97.6÷300=0.325×100=32.5 grams of PAPI per 100 grams of Polyol Sample 2+32.5×4%=33.8 grams per 100

Once this value is obtained, it is divided by the isocyanate index to obtain the combining ratio.

Using 1 gram of water for the foaming agent an amount of 14.4 grams of PAPI was added for conversion to carbon dioxide to create the foam.

So the following ratio amounts were combined in a cup and allow to react:

| | |
|---|---|
| Polyol Sample 2 | 100 grams |
| PAPI | 33.8 grams |
| Water | 1.0 grams |
| PAPI for water | 14.4 grams |
| DBTL | 0.1 grams |

This produced a nice foam that was tough and more rigid than Polyurethane Example 1.

Polyurethane Example 3

Using Polyol Sample 3, since the equivalents of diethylene glycol and adipic acid are equal the equivalents of Peg 400 can be used to calculate the equivalents of hydroxyl components and the hydroxyl number. The hydroxyl number for this polyol is 74.9. This value is calculated by calculating the equivalents supplied by the PEG 400. The hydroxyl number is based on the molecular weight of potassium hydroxide, which is 56.1 and is defined as being milliequivalents of potassium hydroxide per gram of sample.

Once this value is obtained, it is divided by the isocyanate index to obtain the ratio.

74.9÷300=0.25×100=25 grams of PAPI per 100 grams of Polyol Sample 3+25×4%=26 grams per 100

Using 1 gram of water for the foaming agent an amount of 14.4 grams of PAPI was added for conversion to carbon dioxide to create the foam.

So the following ratio amounts were combined in a cup and allow to react:

| | |
|---|---|
| Polyol Sample 3 | 100 grams |
| PAPI | 26 grams |
| Water | .82 grams |
| PAPI for water | 8.5 grams |
| DBTL | 0.1 grams |

In this example less water is used because the total amount of sample is less. Because the polyol of this example was a solid at room temperature it was necessary to first warm it in order to melt it to a liquid form before adding all of the ingredients. This produced dense cell structured foam that expanded and became very rigid and tough after curing.

In all of the above polyurethane examples, foam was generated by mixing liquids at temperatures close to room temperature. It is easy to see that the trend is as the hydroxyl content is lowered, the molecular weight goes up, and the amount of PAPI required to produce a foam is less. However we rapidly approach the point where the polyol becomes a solid and cannot be reacted easily with the isocyanate in a cup or mixing container. The next examples are performed in an extruder.

Polyurethane Example 4

In this example the modifying polymer is prepared and then reacted with the PET in the same reactor. The resulting product is then transferred to an extruder where it is reacted to make the polyurethane. PAPI is injected in a zone downstream from the feed throat. Because of the high temperatures, reaction takes place rapidly and as the polymer exits it expands as foam. The raw materials of the modifying polymer in this example have been changed to reflect the diversity of alcohols and acids that can be used.

Modifying Polymer:

| Ingredient | Amount | Actual Percent |
|---|---|---|
| Peg 600 | 52.20 | 56.80 |
| Peg 200 | 20.00 | 21.76 |
| Phthalic Anhydride | 19.60 | 21.33 |
| Fascat ™ 4100 | 0.08 | 0.09 |
| Tyzor ™ TPT | 0.02 | 0.02 |
| Total | 91.9 | 100.00 |

Reaction with PET:

| Ingredient | Percent |
|---|---|
| Modifying Polymer | 19.6 |
| PET | 78.4 |
| 5-Phenyl Tetrazole | 2.0 |

In this example the modifying polymer was prepared in advance in a small reactor. PET was later added in stages and the reaction was heated to 250 degrees Centigrade until no change in viscosity was noticed. The resulting material was cooled to about 100 degrees Centigrade and the 5-phenyl tetrazole was added. This is a common foaming agent used in high temperature polymers. However, since extremely high temperatures are not needed, other suitable foaming agents will work such as, but not limited to, hydrocarbons, such as hexane or heptane, inert gases such as nitrogen, carbon dioxide, or any of the noble gases.

At this point the polyol polymer was transferred to a twin screw extruder using a Nordstrom™ hot melt pump. The processing temperatures had to be high enough at the end to effect the decomposition of the 5-phenyl tetrazole to nitrogen gas in the range of 230 to 265C. PAPI was injected into the polyol polymer at about 100 degrees Centigrade and the barrel was brought up to 250 degrees Centigrade to effect decomposition of the 5PT prior to exiting the dye. The following ratios of polyol polymer to PAPI were used:

| Ingredient | Parts | Percent |
| --- | --- | --- |
| Polyol polymer from above | 100 | 90.58 |
| PAPI (Stoichiometric plus 4%) | 10.4 | 9.42 |
| Total | 110.4 | 100.00 |

The foam created was very rigid and tough and suitable as structural foam.

Polyurethane Example 5

In this example the modifying polymer was added with the PET in a twin screw extruder and the transesterification reaction was performed in the barrel of the extruder. PAPI was reacted in a further downstream injection and the subsequent foam was generated with a hydrocarbon gas former. This example shows the lower quantities of isocyanate that can be used with higher molecular weights.

| Ingredient | Parts | Percent |
| --- | --- | --- |
| PET | 100.00 | 95.90 |
| Modifying Polymer of Polyol Sample 2 | 1.50 | 1.44 |
| PAPI | 0.78 | 0.74 |
| Heptane | 2.00 | 1.92 |
| Total | 104.28 | 100.00 |

The foam created was extremely rigid and tough and suitable for many kinds of structural uses.

It is in the actual comparison of reaction rates and times for the present process that one becomes aware of the novelty in the present process since the present process is not only faster but much easier to control than those of the prior art. Another substantial benefit of the present process relates to the time for research and development of new polymer types. Instead of being limited to only the beginning mixture of ingredients one can vary the commercially available condensation polymer ratio in the second step of the process and extract research samples along the way thereby producing a wide range of polymer species for property comparisons.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A method of modifying a commercially available condensation polymer, without degradation, comprising:
   synthesizing a modifying polymer from at least one monomer, none of the components used to synthesize the modifying polymer being derived from the commercially available condensation polymer; and
   transesterifying the modifying polymer with the commercially available condensation polymer at a quantity predetermined by the end use application to produce a higher molecular weight final polymer having a molecular weight greater than the modifying polymer or the commercially available condensation polymer.

2. The process of claim 1, wherein the commercially available condensation polymer is polyethylene terephthalate.

3. The process of claim 1 wherein the commercially available condensation polymer is polyethylene naphthalate.

4. The process of claim 1 wherein the higher molecular weight final polymer is a polyol.

5. A hot melt adhesive comprising the higher molecular weight final polymer produced by the process of claim 1.

6. A film forming coating comprising the higher molecular weight final polymer produced by the process of claim 1.

7. A powder coating resin or component of a fusible coating system comprising the higher molecular weight final polymer produced by the process of claim 1.

8. A flexible film comprising the higher molecular weight final polymer produced by the process of claim 1.

9. An unsaturated resin for casting comprising the higher molecular weight final polymer produced by the process of claim 1.

10. The process of claim 3 further comprising reacting the polyol with an isocyanate to produce a polyurethane.

11. A method of modifying a commercially available condensation polymer, without degradation, comprising:
    synthesizing a modifying polymer from at least one monomer, none of the components used to synthesize the modifying polymer being derived from the commercially available condensation polymer, the synthesis being carried out occurring at a reaction time of about 1 hour to about 5 hours and at a temperature of about 150° C. to about 270° C.; and
    transesterifying the modifying polymer with the commercially available condensation polymer at a quantity predetermined by the end use application, the second transesterifying step being carried out at a reaction time of less than about 3 hours and at a temperature of about 200° C. to about 290° C. to produce a higher molecular weight final polymer having a molecular weight greater than about 192 g/mol.

12. The process of claim 11, wherein the commercially available condensation polymer is polyethylene terephthalate.

13. The process of claim 11 wherein the commercially available condensation polymer is polyethylene naphthalate.

14. The process of claim 11 wherein the higher molecular weight final polymer is a polyol.

15. A hot melt adhesive comprising the higher molecular weight final polymer produced by the process of claim 11.

16. A film forming coating comprising the higher molecular weight final polymer produced by the process of claim 11.

17. A powder coating resin or component of a fusible coating system comprising the higher molecular weight final polymer produced by the process of claim 11.

18. A flexible film comprising the higher molecular weight final polymer produced by the process of claim 11.

19. An unsaturated resin for casting comprising the higher molecular weight final polymer produced by the process of claim 11.

20. The process of claim 13 further comprising reacting the polyol with an isocyanate to produce a polyurethane.

* * * * *

UNITED STATES PATENT AND TRADEMARK OFFICE
CERTIFICATE OF CORRECTION

PATENT NO.         : 7,157,139 B2
APPLICATION NO.    : 10/827028
DATED              : January 2, 2007
INVENTOR(S)        : Keith Salsman and Grant Doney It is certified that error appears in the above-identified patent and that said Letters Patent is hereby corrected as shown below:

Title Page,

Please delete the following:

"(60) Provisional application No. 60/487,115, filed on Jul. 15, 2003."

Signed and Sealed this

Thirteenth Day of March, 2007

JON W. DUDAS
*Director of the United States Patent and Trademark Office*